United States Patent [19]

Spring

[11] Patent Number: 4,722,766

[45] Date of Patent: Feb. 2, 1988

[54] EXTINGUISHING OF FIRES AND EXPLOSIONS

[75] Inventor: David J. Spring, Berkshire, England

[73] Assignee: Graviner Limited, Buckinghamshire, England

[21] Appl. No.: 772,963

[22] Filed: Sep. 5, 1985

[30] Foreign Application Priority Data

Sep. 11, 1984 [GB] United Kingdom ................. 8422856

[51] Int. Cl.⁴ ........................ A62D 1/00; C01B 31/18; C01B 31/20; C10K 1/00

[52] U.S. Cl. ........................................... 252/2; 252/8; 252/602; 423/225; 423/230; 423/246; 423/247; 423/579

[58] Field of Search ................... 252/2, 7, 8, 386, 602, 252/605; 428/921; 86/50; 169/46, 47, 49; 514/769, 770; 423/579, 220, 224, 225, 230, 246, 247; 502/317, 318, 324, 327

[56] References Cited

U.S. PATENT DOCUMENTS

| | | | |
|---|---|---|---|
| 3,258,423 | 6/1966 | Tuve et al. | 252/8 |
| 3,634,234 | 1/1972 | Morgenthaler | 252/7 |
| 3,715,438 | 2/1973 | Huggett | 252/8 |
| 3,804,759 | 4/1974 | Becker et al. | 252/8 |
| 3,879,297 | 4/1975 | Languille | 252/8 |
| 3,935,142 | 1/1976 | Wilson | 524/398 |
| 3,956,231 | 5/1976 | Moore et al. | 260/45.75 R |
| 3,960,735 | 6/1976 | Lacey | 252/7 |
| 3,971,373 | 7/1976 | Braun | 128/146.2 |
| 4,087,259 | 5/1978 | Fujitani et al. | 252/8 |
| 4,146,463 | 3/1979 | Radford et al. | 208/120 |
| 4,209,493 | 6/1980 | Olson | 422/176 |
| 4,263,263 | 4/1981 | Vaseen | 423/212 |
| 4,265,837 | 5/1981 | Legutke et al. | 570/243 |

FOREIGN PATENT DOCUMENTS

| | | | |
|---|---|---|---|
| 476552 | 12/1937 | United Kingdom . | |
| 541815 | 12/1941 | United Kingdom . | |
| 567269 | 2/1945 | United Kingdom . | |
| 904560 | 8/1962 | United Kingdom . | |
| 1212850 | 11/1970 | United Kingdom . | |
| 1218521 | 1/1971 | United Kingdom . | |
| 1230835 | 5/1971 | United Kingdom . | |
| 1484020 | 8/1977 | United Kingdom . | |
| 1512581 | 6/1978 | United Kingdom . | |
| 1570514 | 7/1980 | United Kingdom . | |
| 0715092 | 2/1980 | U.S.S.R. | 252/8 |

OTHER PUBLICATIONS

Nonhebel, ed. 1974, Processes for Air Pollution Control, CRC Press, pp. 606–607.

Katz, M. 1953, The Heterogeneous Oxidation of Carbon Monoxide, Advances in Catalysts, vol. 5, pp. 177, 186–190.

Moore, P. 1979, Explosion Suppression in Industry, The Institute of Physics, pp. 202–207.

Merewood, et al. 1958, Industrial Explosion Protection, British Chemical Engineering, London, 3 pages.

Maisey, H. 1959, Explosion Protection in Industry, Chemical & Process Engineering, Mar., 4 pages.

Hawley, G. 1981, The Condensed Chemical Dictionary, Van Nostrand Reinhold Company, New York, p. 536.

*Primary Examiner*—John F. Terapane
*Assistant Examiner*—Howard J. Locker
*Attorney, Agent, or Firm*—Leydig, Voit & Mayer

[57] ABSTRACT

Materials are described which not only extinguish fires or suppress explosions but also remove at least part of any carbon monoxide which may remain after such prior extinguishing or explosion suppressing. Examples of suitable fire extinguishants and explosion suppressants are halocarbons such as bromotrifluoromethane. The carbon monoxide removing substance may comprise Hopcalite catalysts. Other examples of suitable substances are disclosed.

12 Claims, 1 Drawing Figure

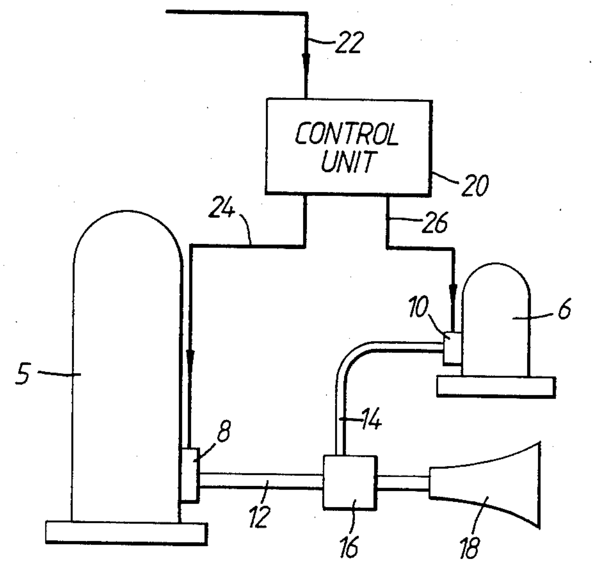
22
CONTROL UNIT
20
24
26
10
6
5
14
8
12
16
18

EXTINGUISHING OF FIRES AND EXPLOSIONS

BACKGROUND OF THE INVENTION

The invention relates to the extinguishing of fires and explosions. More specifically the invention relates to the extinguishing of fires and explosions of carbon-containing fuels.

SUMMARY OF THE INVENTION

According to the invention, there is provided material, comprising a fire extinguishant or explosion suppressant mixed or compounded with a carbon monoxide removing substance which is adapted to remove by chemical action or reaction at least some of any carbon monoxide existing after a fire or explosion has been extinguished or suppressed by the fire extinguishant or explosion suppressant.

According to the invention, there is also provided material comprising a fire extinguishant or explosion suppressant mixed with a Hopcalite catalyst.

According to the invention, there is further provided a system for extinguishing fires or suppressing explosions, comprising first storage means for storing a fire extinguishant or explosion suppressant, second storage means for storing a carbon monoxide removing substance, and control means operative when activated to automatically discharge the fire extinguishant or explosion suppressant into a region to be protected and, immediately thereafter, to discharge the carbon monoxide removing substance, the carbon monoxide removing substance being adapted to remove by chemical action or reaction at least part of any carbon monoxide which remains in the said region after extinguishing or suppressing of any fire or explosion therein.

DESCRIPTION OF DRAWINGS

Substances according to the invention, for use in the suppression of fires or explosions of carbon-containing fuels, and fire or explosion extinguishing or suppressing systems according to the invention, for extinguishing or suppressing fires or explosions of carbon-containing fuels, will now be described, with reference to the accompanying Examples and with reference to the accompanying drawing which is a diagrammatic drawing of one of the systems.

DESCRIPTION OF PREFERRED EMBODIMENTS

Various substances are known for suppressing fires or explosions of carbon-containing fuels. Examples of such extinguishants or suppressants are halocarbons such as bromotrifluoromethane, bromochlorodifluoromethane, and 1,2-dibromotetrafluoroethane, or the powder extinguishants such as potassium bicarbonate, sodium bicarbonate, potassium chloride and the urea/potassium bicarbonate complex.

Systems using such extinguishants or suppressants are also known. Such systems may involve means for storing such extinguishants or suppressants under pressure and for discharging such extinguishants or suppressants into the area where the fire or explosion occurs. Such systems may, for example, operate automatically in response to output signals produced from fire or explosion detection arrangements. Such extinguishants or suppressants are extremely efficient in operation. When used in conjunction with suitable fire or explosion detection systems, they may operate extremely rapidly, within a few milliseconds for example, and may extinguish or suppress the fires or explosions so rapidly that the actual fires or explosion are ineffective in causing any significant harm to human life.

However, all fires or explosions of carbon-containing fuels inevitably produce gaseous products which contain some carbon monoxide—even though the major gaseous product of such a fuel is likely to be carbon dioxide. The ratio of carbon monoxide to carbon dioxide will depend on factors such as the temperature and, most importantly, the stoichiometry (that is, the relative amount of oxygen and fuel present). In general, if there is an excess of oxygen, the major gaseous product will be carbon dioxide and there may be little or no carbon monoxide present. However, if there is insufficient oxygen, a substantial proportion of the gaseous products will be carbon monoxide. The carbon dioxide usually arises through combustion of carbon monoxide which is the initially formed gas. Thus, any restriction of the air and thus the oxygen supply will result in less carbon dioxide and more carbon monoxide found in the gaseous products. Injection of an extinguishant or an explosion suppressant into the area where the fire or explosion occurs will tend to restrict the air and thus the oxygen supply and may thus result in incomplete conversion of carbon monoxide into carbon dioxide.

Carbon monoxide is a gas which is extremely poisonous to human beings. Tests have shown that, after a fire which has been efficiently suppressed by one of the fire extinguishants described above, it is possible for carbon monoxide concentrations to be sufficiently high to present a significant hazard to human life, and this is particularly so if the fire takes place in an enclosed space from which immediate evacuation is not possible or difficult. For example, monitoring of the carbon monoxide present immediately following suppression of a fire shows concentrations of 0.1 to 1 percent of carbon monoxide. Even a 0.1 percent concentration of carbon monoxide is sufficient to cause death after two hours, while a 1 percent concentration of carbon monoxide can cause death in a few minutes. Therefore, even though the concentration of carbon monoxide following such a suppressed fire is considerably lower than the 2 to 15 percent concentration of carbon monoxide which is likely to be present in the region of an unsuppressed fire, it can still present a very considerable hazard.

In accordance with features of the invention, therefore, a carbon monoxide removing substance, that is, a substance which by chemical action or reaction (which terms include catalytic action) reduces the concentration of carbon monoxide, is introduced into the region of the fire or explosion, in combination with the extinguishant or suppressant. "In combination with" includes introducing such a substance at the same time as the extinguishant or suppressant is introduced or immediately thereafter. Advantageously, the carbon monoxide removing substance is introduced in the form of an aerosol of solid or liquid particles.

If the carbon monoxide removing substance is in the form of an aerosol of solid or liquid particles, then, because the carbon monoxide itself is a gas, the interaction between them is heterogeneous in nature and, as a result, will be more efficient as the particle size of the carbon monoxide removing substance is reduced. This is because the effectiveness of a given agent will depend upon its specific surface area, or surface area per unit weight, and this is in inverse relationship to the particle size.

The carbon monoxide removing substances may take any suitable form. For example, they may take the form of one or more of the so-called "Hopcalite" catalysts. These consist of a mixture of transition metal oxides. The major constituents are normally manganese oxide ($MnO_2$) and copper oxide (CuO). Minor amounts of other oxides such as cobalt oxide ($Co_2O_3$) and silver oxide ($Ag_2O$) may be present. Typical mixtures are given in Table 1 below.

TABLE 1

| Oxide | Examples (percent) I | II | III | IV |
|---|---|---|---|---|
| $MnO_2$ | 50 | 60 | 85 | 70 |
| CuO | 30 | 40 | 15 | 30 |
| $Co_2O_3$ | 15 | — | — | — |
| $Ag_2O$ | 5 | — | — | — |

Hopcalite catalysts function by oxidising the carbon monoxide to carbon dioxide by means of a catalytic surface reaction. The Hopcalite must be protected from moisture during storage. It is dispersed into the region to be protected in the form of a fine solid powder. It may be stored and dispensed with the fire extinguishant or explosion suppressant, that is, dispensed simultaneously with the extinguishant or suppressant. Instead, it may be stored in a container which is separate from that storing the extinguishant or suppressant. The containers which respectively contain the extinguishant or suppressant and the Hopcalite are controllably interconnected so that discharge of the extinguishant or suppressant is automatically followed, immediately thereafter, by discharging of the Hopcalite. Thus, as shown in the FIGURE, the fire extinguishant or explosion suppressant, of conventional form, may be stored under pressure in a main container 5 and the Hopcalite may be stored under pressure in a secondary container 6. The containers are connected, via respective electrically controllable discharge means 8 and 10, pipes 12 and 14 and a connector 16, to a discharge nozzle 18. The system is controlled by a control unit 20. In response to an alarm signal on a line 22, the control unit 18 opens the discharge means 8 via a line 24 and the fire extinguishant or explosion suppressant is discharged through nozzle 18 via connector 16. Immediately thereafter, the control unit 20 energises a line 26 which opens the discharge means 10 and the Hopcalite is discharged through nozzle 18 via connector 16.

Some more specific examples of the use of Hopcalite now follow:

EXAMPLE 1

Hopcalite catalyst, obtained from BDH Chemicals Ltd. of Poole, Dorset, England, was activated by drying in an oven at 200° C. for 2 hr. The catalyst had an analysis corresponding to 50% $MnO_2$, 30% CuO, 14% $Co_2O_3$ and 6% $Ag_2O$. Its appearance was a free flowing black powder, 3% of which by weight was retained by a 212 micrometer sieve, 15% by a 106 micrometer sieve and 63% by a 53 micrometer sieve.

The Hopcalite was dispersed by a small charge of compressed air into a large volume containing carbon monoxide and air. The volume of air used to disperse the Hopcalite was typically about 4% of the volume of the air containing the carbon monoxide. The concentration of the carbon monoxide was measured using a proprietary instrument, a Neotronics (Trade Mark) C0101 monitor.

As a general approximation, the reduction in the concentration of carbon monoxide brought about by the Hopcalite was considered to be a first order process with respect to carbon monoxide. This approximation was certainly true for the early stages of the reaction. Table 2 shows that the times taken to achieve a 50% reduction in the carbon monoxide concentration were essentially independent of the initial concentration of carbon monoxide and this supports the treatment of the reaction as a first order process. For all the cases in the Table the amount of Hopcalite dispersed was such as to achieve a concentration in the large volume of 4.1 $kg.m^{-3}$.

TABLE 2

| Initial Co Concentration ppm (by volume) | Time to Reduce Concentration by 50% s |
|---|---|
| 512 | 85 |
| 1021 | 107 |
| 1415 | 91 |
| 2298 | 106 |
| 3020 | 109 |
| 3770 | 103 |

EXAMPLE 2

Hopcalite catalyst, as in Example 1, was dispersed in varying amounts, into the large volume containing approximately 2300 ppm of carbon monoxide. The reduction in the concentration of carbon monoxide with time was treated as being a first order process with respect to carbon monoxide and corresponding rate constants were calculated, as shown in Table 3. The greater the value of the rate constant, then the faster and more efficient is the agent in removing carbon monoxide.

TABLE 3

| Hopcalite Amount $kg.m^{-3}$ | Initial CO Concentration ppm | 1st Order Rate Constant $s^{-1}$ |
|---|---|---|
| 0.66 | 2079 | $5.3 \times 10^{-4}$ |
| 1.71 | 2353 | $1.7 \times 10^{-3}$ |
| 2.87 | 2321 | $3.0 \times 10^{-3}$ |
| 5.81 | 2450 | $6.3 \times 10^{-3}$ |

EXAMPLE 3

The Hopcalite of Example 1 was fractionated into different particle size ranges by sieving, and these were dispersed into large volumes containing carbon monoxide as in Examples 1 and 2. The resulting values for the first order rate constant clearly show (see Table 4) the importance of particle size in determining the effectiveness of a given carbon monoxide removing substance.

TABLE 4

| Hopcalite Amount $kg.m^{-3}$ | Particle Size Range micrometers | Initial CO Concentration ppm | Rate Constant $s^{-1}$ |
|---|---|---|---|
| 3.21 | <53 | 2517 | $5.2 \times 10^{-3}$ |
| 3.21 | 53-106 | 2134 | $2.8 \times 10^{-3}$ |
| 3.07 | 106-212 | 2241 | $9.3 \times 10^{-4}$ |

Another carbon monoxide removing substance which may be used is a solution of copper chloride which absorbs carbon monoxide in the presence of ammonia or hydrochloric acid.

A further substance which may be used is the palladium sulphate/silicomolybdate complex which catalyses the oxidation of carbon monoxide at ambient temperatures. The complex may be produced by treating silica gel with a solution of $PdSO_4$ and $(NH_4)_2MoO_4$. A more specific example of this process is as follows:

EXAMPLE 4

A sample of palladium catalysed silicomolybdate complex was prepared by a modification of the route of M. Shepherd in Analytical Chemistry (1947), 19, 77–81:

$Pd(NO_3)_2.2H_2O$ (1.0 g) was dissolved in 33% $H_2SO_4$ (30 ml) and added to ammonium molybdate solution (150 ml, containing 7.5 g of $(NH_4)_2MoO_4$) and the mixture added to approximately 600 ml of activated silica gel. After the resulting slurry had been allowed to stand overnight, the excess water was removed on a rotary evaporator, and then under high vacuum to yield a free-flowing powder (271 g). The calculated Mo content of the solid was about 1.5% and this corresponded to about 2.4% of silicomolybdate complex.

Various amounts of this material were then dispersed into the large volume and the resulting rate constants for carbon monoxide removal determined, as shown in Table 5.

TABLE 5

| Amount of Complex $kg.m^{-3}$ | Initial CO Concentration ppm | Rate Constant $s^{-1}$ |
|---|---|---|
| 4.9 | 2065 | $4.2 \times 10^{-3}$ |
| 6.9 | 2250 | $6.0 \times 10^{-3}$ |
| 8.6 | 2195 | $7.7 \times 10^{-3}$ |

It may also be possible under certain circumstances to use elemental metals for catalysing the oxidation of carbon monoxide, such as platinum and especially palladium which may be supported on inert materials such as alumina or silica.

A more specific example of those of palladium as follows:

EXAMPLE 5

Various amounts of palladium metal on different inert supports were dispersed into the large volume containing approximately 2000 ppm of carbon monoxide. The resulting values (see Table 6) for the first order rate constant show that these materials are effective carbon monoxide removing substances.

TABLE 6

| Material | Amount $kg.m^{-3}$ | Initial CO Concentration ppm | Rate Constant $s^{-1}$ |
|---|---|---|---|
| 5% Pd on alumina | 1.03 | 2220 | $3.3 \times 10^{-3}$ |
| 5% Pd on alumina | 2.76 | 1955 | $7.8 \times 10^{-3}$ |
| 5% Pd on carbon | 1.03 | 1967 | $2.5 \times 10^{-3}$ |
| 5% Pd on carbon | 1.72 | 2045 | $4.2 \times 10^{-3}$ |
| 10% Pd on carbon | 1.89 | 2265 | $1.8 \times 10^{-2}$ |
| 10% Pd on carbon | 3.34 | 2049 | $2.1 \times 10^{-2}$ |

A further possibility consists of ferroporphyrin complexes. Such complexes consist of a central iron atom in the 2+ oxidation state chelated by a porphyrin ring system. Such complexes are the basis of haemoglobin.

They act by forming involatile complexes which do not involve the oxidation of carbon monoxide.

Another substance which may be used as a carbon monoxide removing substance is acid or ammoniacal copper (I) chloride complexes supported on inert materials. Such examples act in the same general way as ferroporphyrin complexes in that they form involatile complexes which do not involve the oxidation of carbon monoxide, for example $$ClCu + CO \rightarrow ClCu.CO$$

I claim:

1. A dispersable material, comprising a halogenated-hydrocarbon fire extinguishant or explosion suppressant used in conjunction with an oxidation-promoting substance which is adapted to promote removal by oxidation of at least some of any carbon monoxide existing after a fire or explosion has been extinguished or suppressed by the fire extinguishant or explosion suppressant, and thereby maintaining a habitable atmosphere, said oxidation promoting substance selected from the group consisting of Hopcalite; a palladium sulfate/-silicomolybdate complex; copper (I) chloride in the presence of acid or ammonia; platinum metal; palladium metal; and ferroporphyrin complex.

2. Material according to claim 1, in which the oxidation-promoting substance is in the form of an aerosol of solid or liquid particles.

3. A dispersable material, comprising a halogenated-hydrocarbon fire extinguishant or explosion suppressant mixed or compounded with a carbon monoxide removing substance which comprises at least one of the elements, their alloys, salts, compounds or complexes selected from the transition metal groups VII, VIII and IB of the Periodic Table, the substance being adapted to promote removal by oxidation of at least some of any carbon monoxide existing after a fire or explosion has been extinguished or suppressed by fire extinguishant or explosion suppressant.

4. Material according to claim 3, in which the said substance comprises at least one of the salts, compounds and complexes of one or more of the metals manganese, iron, nickel, copper and palladium.

5. Material according to claim 1, in which the said substance is a mixture primarily comprising manganese oxide and copper oxide.

6. Material according to claim 5, in which the said substance includes minor amounts of cobalt oxide.

7. Material according to claim 5, in which the said substance includes a minor amount of silver oxide.

8. Material according to claim 1, in which the substance is Hopcalite.

9. Material according to claim 1, in which the substance comprises the palladium sulphate/silicomolybdate complex.

10. Material according to claim 1, in which the said substance comprises an elemental metal.

11. Material according to claim 10, in which the metal is platinum or palladium.

12. Material according to claim 3, in which the substance comprises the palladium sulphate/silicomolybdate complex.

* * * * *